(12) United States Patent
Uesugi et al.

(10) Patent No.: US 10,151,380 B2
(45) Date of Patent: Dec. 11, 2018

(54) TRANSMISSION AND MANUFACTURING METHOD OF THE SAME

(71) Applicant: Mazda Motor Corporation, Aki-gun, Hiroshima (JP)

(72) Inventors: Tatsuya Uesugi, Onomichi (JP); Kazuhiko Ueda, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 152 days.

(21) Appl. No.: 15/267,014

(22) Filed: Sep. 15, 2016

(65) Prior Publication Data

US 2017/0089447 A1    Mar. 30, 2017

(30) Foreign Application Priority Data

Sep. 29, 2015  (JP) ................. 2015-192019

(51) Int. Cl.
*F16H 57/04* (2010.01)
*F16H 57/02* (2012.01)
*F16H 57/03* (2012.01)

(52) U.S. Cl.
CPC ......... *F16H 57/0415* (2013.01); *F16H 57/02* (2013.01); *F16H 57/03* (2013.01); *F16H 57/0417* (2013.01); *F16H 57/0424* (2013.01)

(58) Field of Classification Search
CPC .......... F16H 57/02; F16H 57/03; F16H 57/04; F16H 57/0412; F16H 57/0413; F16H 57/0415; F16H 57/0417; F16H 57/0419; F16H 57/0421; F16H 57/0424; F16H 57/0445; B21D 53/02; B23P 15/26

See application file for complete search history.

(56) References Cited

U.S. PATENT DOCUMENTS

| 4,958,537 | A | * | 9/1990 | Diehl | ................. | B22D 19/0072 |
| | | | | | | 123/195 C |
| 5,678,461 | A | * | 10/1997 | Stine | ......................... | F01P 3/20 |
| | | | | | | 184/6 |
| 6,432,018 | B1 | * | 8/2002 | Morse | ................... | F16H 57/037 |
| | | | | | | 475/161 |

(Continued)

FOREIGN PATENT DOCUMENTS

| DE | 102008020646 A1 | * | 10/2009 | ............. | B60K 17/16 |
| EP | 0990820 A2 | * | 4/2000 | ......... | F16H 57/0412 |

(Continued)

OTHER PUBLICATIONS

Machine translation of DE 102008020646 A1 obtained on Apr. 10, 2018. (Year: 2018).*

(Continued)

*Primary Examiner* — Adam D Rogers
(74) *Attorney, Agent, or Firm* — Alleman Hall Creasman & Tuttle LLP

(57) ABSTRACT

A transmission is provided, which includes a transmission case accommodating a transmission mechanism, and a heat exchanger for exchanging heat between oil supplied to a given location inside the transmission case and a heat medium supplied from the outside of the transmission case, the heat exchanger being provided between an external surface and an internal surface of the transmission case.

9 Claims, 9 Drawing Sheets

(56) References Cited

U.S. PATENT DOCUMENTS

| | | | | |
|---|---|---|---|---|
| 6,830,096 | B1* | 12/2004 | Fett | F16H 57/0412 165/104.21 |
| 6,997,238 | B1* | 2/2006 | Ruthy | F16H 57/0417 165/41 |
| 7,637,337 | B2* | 12/2009 | Stranges | F01M 11/0004 180/69.1 |
| 7,748,442 | B2* | 7/2010 | Kalbacher | F01M 5/002 165/166 |
| 8,069,951 | B2* | 12/2011 | Sugano | F16H 57/0489 165/119 |
| 2006/0054411 | A1* | 3/2006 | Fett | F16H 57/0412 184/6.22 |
| 2009/0107769 | A1* | 4/2009 | Sato | B60K 6/365 184/6.2 |
| 2011/0011568 | A1* | 1/2011 | Han | F28D 9/0043 165/133 |
| 2012/0156516 | A1* | 6/2012 | Matsui | B29C 64/165 428/515 |
| 2014/0157952 | A1* | 6/2014 | Chudy | F16H 57/0483 74/606 A |
| 2017/0023130 | A1* | 1/2017 | Uesugi | F16H 61/0276 |
| 2017/0051821 | A1* | 2/2017 | Long | F16H 57/0412 |

FOREIGN PATENT DOCUMENTS

| | | | |
|---|---|---|---|
| JP | 5-75553 U | * | 10/1993 |
| JP | 5-76845 U | * | 10/1993 |
| JP | H05075553 U | | 10/1993 |
| JP | H05076845 U | | 10/1993 |
| JP | 2014149017 A | | 8/2014 |

OTHER PUBLICATIONS

Machine translation of EP 0990820 A2 obtained on Apr. 11, 2018. (Year: 2018).*

* cited by examiner

TRANSMISSION AND MANUFACTURING METHOD OF THE SAME

BACKGROUND

The present invention relates to a transmission for a vehicle, which is provided with a heat exchanger for exchanging heat between oil supplied to a given location inside a transmission case and a heat transfer medium (heat medium) supplied from outside of the transmission case. The present invention also relates to a method of manufacturing the transmission.

Automatic transmissions mounted on vehicles are provided with a transmission mechanism having hydraulic actuators, such as for a clutch and a brake, and the gear is suitably changed according to the operating state of the vehicle by controlling supply and discharge of hydraulic oil to/from the hydraulic actuators. On the other hand, manual transmissions are provided with a transmission mechanism having a pair of parallel shafts and a plurality of gear trains which bridge between the shafts, and a desired gear ratio is selected by using one of the gear trains in a power transmitting state in response to an operation of a gear stick.

As for both the automatic and manual transmissions, oil is suitably supplied to gear mating parts and bearings for lubrication and cooling, and, particularly for the automatic transmission, oil is also supplied and discharged to/from hydraulic chambers of the hydraulic actuators and a torque converter.

If the temperature of the oil supplied to each component inside a transmission case is too low, the viscosity of the oil becomes high, and thus, inconveniences occur, such as a delay in the hydraulic control, and an increase in the rotational resistance of the rotating bodies (e.g., gears). On the other hand, if the temperature of the oil is too high, inconveniences occur, such as a faster deterioration of the oil. Thus, in order to cool or heat the oil supplied to each component inside the transmission case to a suitable temperature, heat exchangers are conventionally used for exchanging heat between the oil and heat medium, such as water, supplied from, for example, a cooling system of an engine, which is located outside the transmission case.

For example, as disclosed in JP2014-149017A, a conventional heat exchanger used in a transmission is attached to a perimeter surface of a transmission case. Oil supplied to an oil channel formed in the heat exchanger is cooled down to a suitable temperature by a heat exchange with a low-temperature heat medium supplied from an engine cooling system etc., or heated by a heat exchange with a high-temperature heat medium, and is then supplied to each component inside the transmission case.

However, since the conventional structure in which the heat exchanger is attached outside the transmission case disclosed in JP2014-149017A increases the transmission in size, an improvement may be possible in the way to mount the transmission on the vehicle.

In addition, since it is necessary to avoid interference of peripheral components of the transmission with the heat exchanger attached outside the transmission case and piping connected to the heat exchanger, a degree of freedom in layout of the peripheral components is reduced.

In addition, brackets, and seal members for preventing an oil leakage, etc., are required in order to attach the heat exchanger to the outside of the transmission case, and thus, there are problems such that the number of components increases and the assembly becomes complicated.

SUMMARY

The present invention is made in view of solving the above issues, and aims to achieve a downsizing of a transmission provided with a heat exchanger having a heat-exchange function, an improvement in a degree of freedom in layout of peripheral components of the transmission, a reduction in the number of components, and a simplification of assembly of the transmission.

In order to achieve the above purpose, the transmission according to the present invention and a method of manufacturing the same are characterized by being configured as follows.

According to one aspect of the present invention, a transmission is provided, which includes a transmission case accommodating a transmission mechanism, and a heat exchanger for exchanging heat between oil supplied to a given location inside the transmission case and the heat medium supplied from the outside of the transmission case, the heat exchanger being provided between an external surface and an internal surface of the transmission case.

With the above configuration, since the heat exchanger is provided between the external surface and the internal surface of the transmission case, by utilizing a large area of a peripheral wall of the transmission case, a sufficient space for exchanging heat between the oil and the heat medium can be secured, and the heat exchanger can be formed compactly in thickness directions of the transmission case. Therefore, the transmission will not be increased in size even when the heat exchanger is formed therewith. As a result, mountability of the transmission to a vehicle can be increased, compared with conventional transmissions in which a heat exchanger is mounted outside a transmission case.

Further, a degree of freedom in layout of peripheral components of the transmission can be increased, compared with the conventional transmissions in which the heat exchanger is disposed outside the transmission case. In addition, since brackets and seal members for mounting the heat exchanger to the outside of the transmission case can be omitted, the number of components can be reduced and assembly can be simplified.

Moreover, a connection between a heat-medium channel of the heat exchanger provided between the external surface and the internal surface of the transmission case and a piping for the heat medium supplied from the outside of the transmission can be formed at any location of the external surface of the transmission case. Therefore, a layout of the piping for the heat medium can be designed freely.

The transmission case may include an external wall part constituting the external surface, an internal wall part disposed inwardly from the external wall part and separated from the external wall part, the internal wall part constituting the internal surface, and a reinforcement part integrally connecting the external wall part and the internal wall part. The heat exchanger may be provided between the external wall part and the internal wall part.

With the above configuration, since the heat exchanger is provided to a hollowed portion of the peripheral wall which is formed by providing the external wall part and the internal wall part in the transmission case while the reinforcement part integrally connecting the external wall part and the internal wall part is provided to the portion of the peripheral wall which is hollowed, rigidity of the portion of the peripheral wall can suitably be secured.

According to another aspect of the present invention, a transmission is provided, which includes a transmission case accommodating a transmission mechanism, and a heat exchanger for exchanging heat between oil supplied to a given location inside the transmission case and the heat medium supplied from the outside of the transmission case, the heat exchanger being integrally provided to at least a part of a peripheral wall of the transmission case.

With the above configuration, since the heat exchanger is integrally provided to at least a part of the peripheral wall of the transmission case, by utilizing a large area of the peripheral wall of the transmission case, a sufficient space for exchanging heat between the oil and the heat medium can be secured, and the heat exchanger can be formed compactly in the thickness directions of the peripheral wall. Therefore, the transmission will not be increased in size even when the heat exchanger is formed therewith. In addition, mountability of the transmission to a vehicle can be increased, compared with conventional transmissions in which a heat exchanger is mounted outside a transmission case.

Further, since the heat exchanger is integrally formed with the peripheral wall of the transmission case, the part of the peripheral wall is also used as the heat exchanger. Therefore, the material needed to form the transmission case and the heat exchanger is reduced, compared with the conventional transmissions in which the transmission case and the heat exchanger are separately formed. This can result in a downsizing and a weight reduction of the transmission.

Furthermore, a degree of freedom in layout of peripheral components of the transmission can be increased, compared with the conventional transmissions in which the heat exchanger is disposed outside the transmission case. In addition, since brackets and seal members for mounting the heat exchanger to the outside of the transmission case can be omitted, the number of components can be reduced and the assembly can be simplified.

Moreover, a connection between a heat-medium channel of the heat exchanger integrally provided to the peripheral wall of the transmission case and a piping for the heat medium supplied from the outside of the transmission can be formed at any location of the peripheral wall. Therefore, layout of the piping for the heat medium can be designed freely.

The transmission case may be a cylindrical member extending parallel to shaft directions of the transmission mechanism.

With the above configuration, since the cylindrical transmission case extending parallel to the shaft directions of the transmission mechanism is formed by a three-dimensional lamination modeling method in a laminating direction along the shaft directions, the transmission case is formed without being collapsed during the modeling, and therefore, the transmission case and the heat exchanger can be formed with sufficient accuracy.

The heat exchanger may be provided with an oil channel where the oil flows and a heat-medium channel where the heat medium flows, and peripheral walls of the oil channel and the heat-medium channel may be integrally provided with the peripheral wall of the transmission case.

With the above configuration, since the peripheral walls of the oil channel and the heat-medium channel in the heat exchanger are integrally provided with the peripheral wall of the transmission case, the integration between the heat exchanger and the peripheral wall of the transmission case can practically be achieved.

The oil channel and the heat-medium channel may extend in directions perpendicular to thickness directions of the peripheral wall of the transmission case.

With the above configuration, since the oil channel and the heat-medium channel of the heat exchanger extend in parallel to each other, the heat exchange can effectively be achieved between the oil and the heat medium. In addition, since these channels are provided to extend in the directions perpendicular to the thickness directions of the peripheral wall of the transmission case, the heat exchanger can be formed compactly in the thickness directions.

According to another aspect of the present invention, a method of manufacturing a transmission provided with a transmission case that accommodates a transmission mechanism, and a heat exchanger for exchanging heat between oil supplied to a given location inside the transmission case and a heat medium supplied from the outside of the transmission case, is provided. The method includes integrally forming the heat exchanger with a peripheral wall of the transmission case by a three-dimensional lamination modeling method, the heat exchanger being formed in at least a part of the peripheral wall of the transmission case.

With the above configuration, since the heat exchanger is integrally formed with the peripheral wall of the transmission case by the three-dimensional lamination modeling method, the heat exchanger is formed in at least a part of the peripheral wall. Thus, by utilizing a large area of the peripheral wall of the transmission case, a sufficient space for exchanging heat between the oil and the heat medium can be secured, and the heat exchanger can be formed compactly in thickness directions of the peripheral wall. Therefore, the transmission will not be increased in size even when the heat exchanger is formed therewith. As a result, mountability of the transmission to a vehicle can be increased, compared with the conventional transmissions in which the heat exchanger is mounted outside the transmission case.

Further, since the heat exchanger is integrally formed with the peripheral wall of the transmission case, the part of the peripheral wall of the transmission case is also used as the heat exchanger. Therefore, the material needed to form the transmission case and the heat exchanger is reduced, compared with the conventional transmissions in which the transmission case and the heat exchanger are separately formed. This can result in a downsizing and a weight reduction of the transmission.

Furthermore, a degree of freedom in layout of peripheral components of the transmission can be increased, compared with the conventional transmissions in which the heat exchanger is disposed outside the transmission case. In addition, since brackets and seal members for mounting the heat exchanger to the outside of the transmission case can be omitted, the number of components can be reduced and the assembly can be simplified.

Moreover, a connection between a heat-medium channel of the heat exchanger integrally provided to the peripheral wall of the transmission case and a piping for the heat medium supplied from the outside of the transmission can be formed at any location of the peripheral wall. Therefore, layout of the piping for the heat medium can also be designed freely.

An external wall part constituting an external surface of the peripheral wall of the transmission case, an internal wall part disposed inwardly from the external wall part and separating from the external wall part, the internal wall part constituting an internal surface of the peripheral wall, and a reinforcement part integrally connecting the external wall part and the internal wall part, may be formed in at least a part of the peripheral wall, the heat exchanger being formed between the external wall part and the internal wall part.

With the above configuration, since the heat exchanger is provided to a hollowed portion of the peripheral wall which is formed by providing the external wall part and the internal wall part in at least a part of the peripheral wall of the transmission case while the reinforcement part integrally connecting the external wall part and the internal wall part is provided to the portion of the peripheral wall which is hollowed, rigidity of the portion of the peripheral wall can suitably be secured.

An oil channel where the oil flows and a heat-medium channel where the heat medium flows may be formed in the heat exchanger, and the reinforcement part may be comprised of peripheral walls of the oil channel and the heat-medium channel.

With the above configuration, since the peripheral walls of the oil channel and the heat-medium channel in the heat exchanger function as the reinforcement part, the rigidity of the peripheral wall portion can be increased without providing an exclusive reinforcement part between the external wall part and the internal wall part of the peripheral wall of the transmission case. Since the exclusive reinforcement part is omitted, an arrangement space of the oil channel and the heat-medium channel is well-secured, and thus, an improvement in heat-exchange performance can be achieved.

The peripheral wall of the transmission case, the heat exchanger, and a valve body of a hydraulic control device for controlling the transmission mechanism may be integrally formed by the three-dimensional lamination modeling method so that the oil channel and an oil channel of the valve body are communicatively coupled.

With the above configuration, since the peripheral wall of the transmission case and the heat exchanger as well as the valve body of the hydraulic control device are integrally formed by the three-dimensional lamination modeling method, a reduction in the number of components and the assembly time of the transmission can be achieved. Further, since a part of the peripheral wall of the transmission case is also used as the heat exchanger and the valve body, the material needed to form the transmission case, the heat exchanger and the valve body is reduced, compared with a case where these are separately formed. This can result in the downsizing and the weight reduction of the transmission.

Furthermore, since the heat exchanger and the valve body are integrally formed so that the oil channel of the heat exchanger is communicatively coupled to the oil channel of the valve body, piping for connecting these oil channels is omissible, and the number of components and the assembly time can be further reduced.

The peripheral wall of the transmission case may be formed into a cylinder having an axial center parallel to a laminating direction of the three-dimensional lamination modeling method.

With the above configuration, in forming the cylindrical transmission case by the three-dimensional lamination modeling method, since the modeling is performed in the laminating direction along the axial center of the transmission case, the transmission case is formed without being collapsed during the modeling. Therefore, the transmission case and the heat exchanger can be formed with sufficient accuracy.

DETAILED DESCRIPTION OF EMBODIMENTS

Hereinafter, a structure of a transmission according to one embodiment of the present invention is described with reference to the accompanying drawings.

Figure 1:
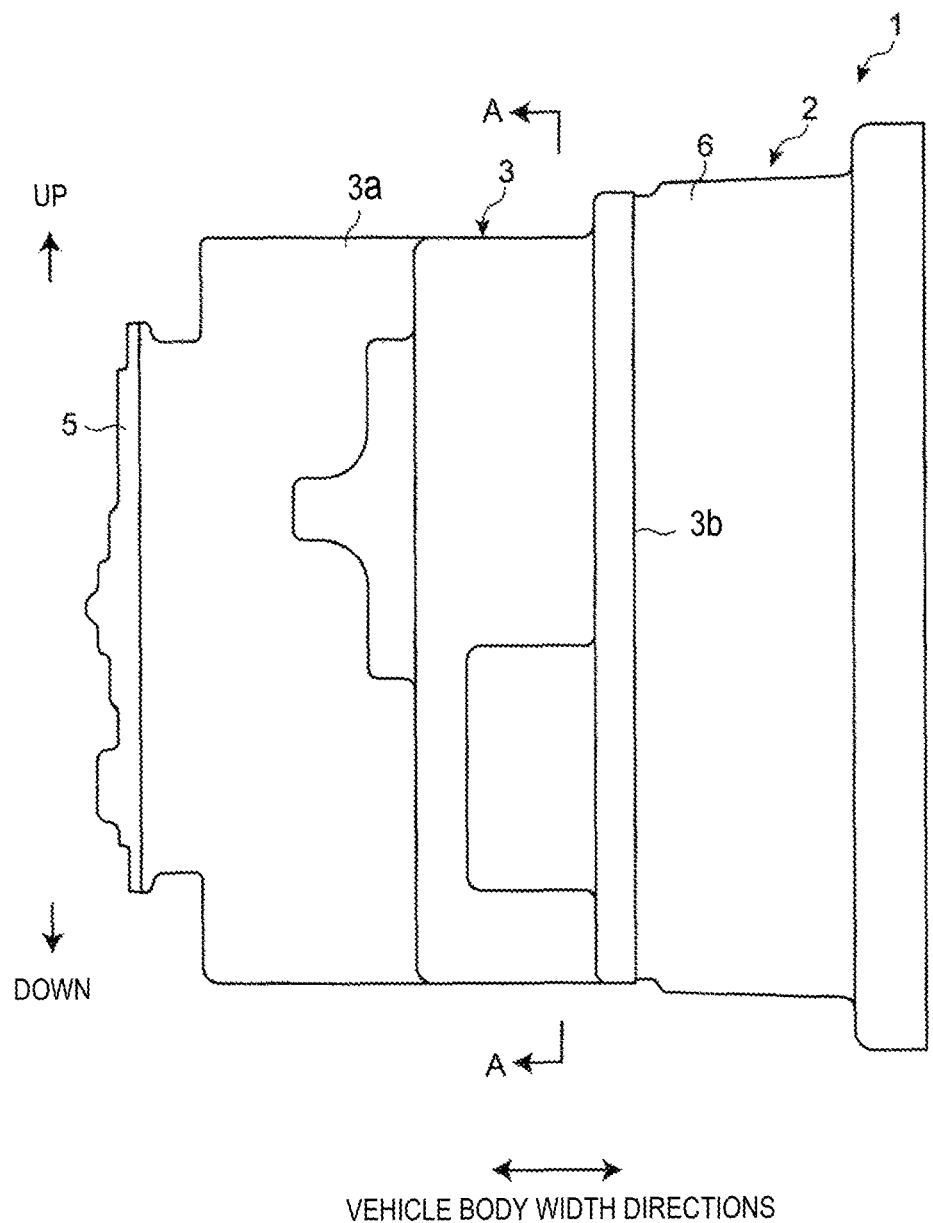
FIG. 1 is a view illustrating a transmission according to one embodiment of the present invention, viewed from the rear of a vehicle body.
Figure 2:
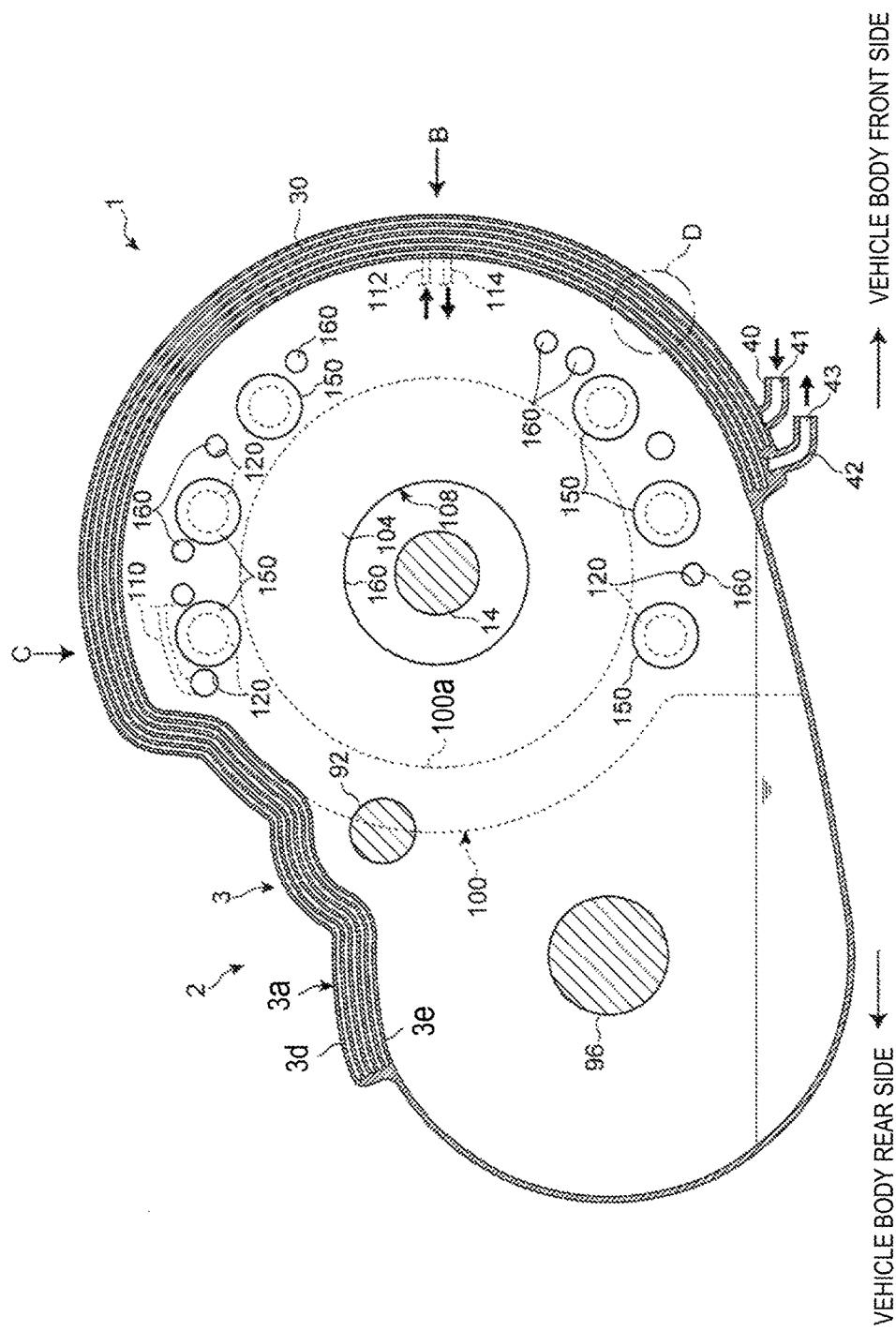
FIG. 2 is a cross-sectional view taken along a line A-A in FIG. 1, schematically illustrating an internal structure of the transmission.
Figure 3:
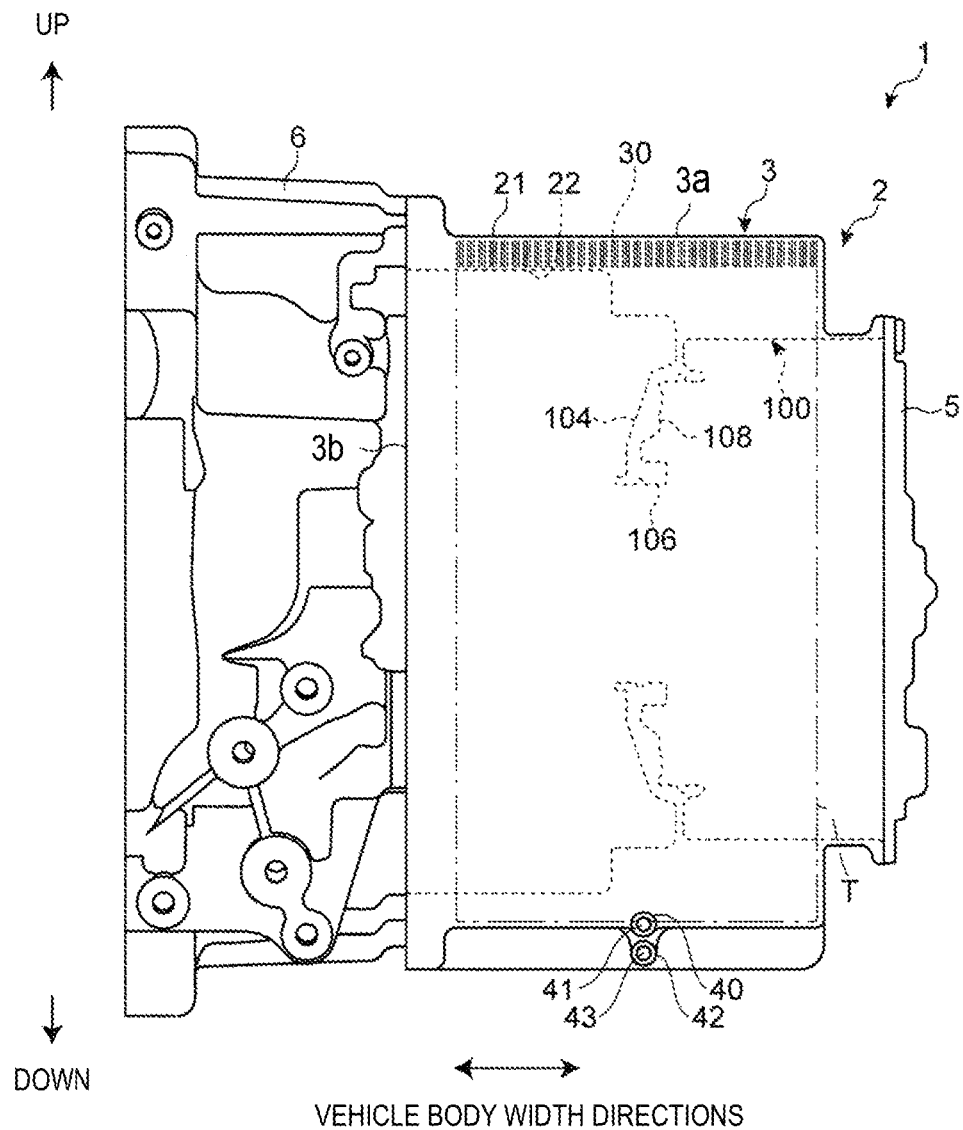
FIG. 3 is a B-direction view in FIG. 2, illustrating the transmission.
Figure 4:
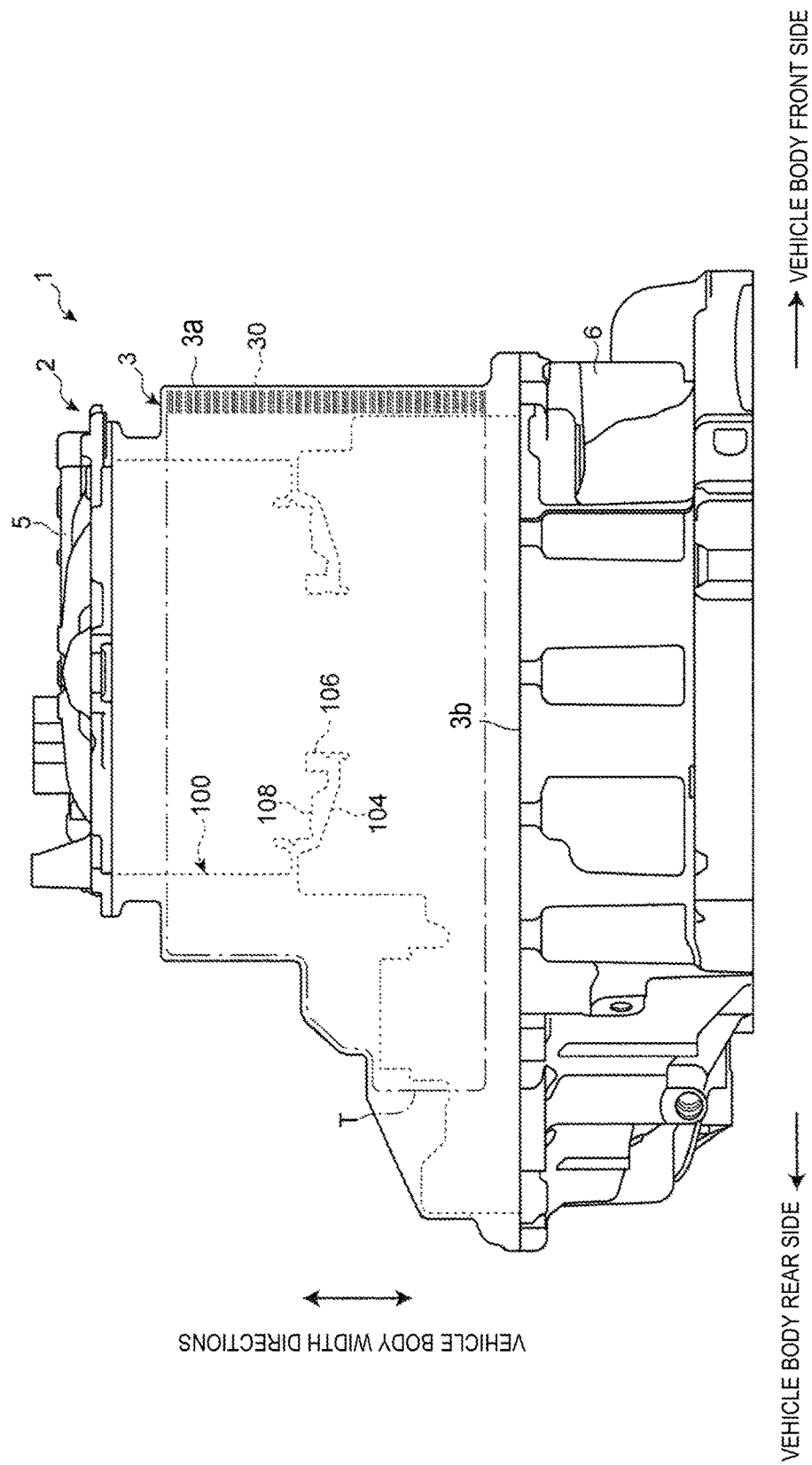
FIG. 4 is a C-direction view in FIG. 2, illustrating the transmission.

FIG. 1 is a view illustrating the transmission according to one embodiment, viewed from the rear of a vehicle body. FIG. 2 is a cross-sectional view taken along a line A-A in FIG. 1, schematically illustrating an internal structure of the transmission. FIG. 3 is a B-direction view in FIG. 2, illustrating the transmission. FIG. 4 is a C-direction view in FIG. 2, illustrating the transmission. Note that illustration of a transmission mechanism is omitted in FIG. 2 in order to facilitate understanding of the invention.

Entire Structure of Transmission

As illustrated in FIGS. 1 to 4, the transmission according to this embodiment is, for example, an automatic transmission 1 which is applied to a vehicle having a transversely mounted engine, such as a front-engine front-drive vehicle. The automatic transmission 1 is provided with a transmission case 2 which accommodates a transmission mechanism (not illustrated) having an axial center extending in vehicle body width directions. Note that, although illustration is omitted, a drive source, such as an engine, is disposed on the right side of the automatic transmission 1 in the vehicle body width directions.

As illustrated in FIG. 2, the automatic transmission 1 is provided with an input shaft 14 extending parallel to the axial center of the transmission mechanism, and a counter shaft 92 disposed in parallel with the input shaft 14, at the rear side of the vehicle body with respect to the input shaft 14. For example, the input shaft 14 is integrally constructed with a turbine shaft (not illustrated) which is an output part of a torque converter, and is coupled to the drive source via the torque converter.

Note that, on the axis of the input shaft 14, a plurality of friction coupling elements (not illustrated) which constitute the transmission mechanism, such as a clutch and a brake, are provided. Thus, the gear is changed according to the gear position or the operating state of the vehicle by a hydraulic control of a hydraulic control device which selectively couples the friction coupling elements.

The input shaft 14 and the counter shaft 92 are drivably coupled to each other by an engagement between a counter drive gear (not illustrated) as an output part disposed coaxially with the input shaft 14, and a counter driven gear (not illustrated) provided on the counter shaft 92.

Axles 96 are disposed obliquely below the counter shaft 92 and rearward in vehicle body longitudinal directions. A differential ring gear (not illustrated) of a differential gear mechanism is disposed on the axis of the axles 96 to mesh with a final drive gear (not illustrated) provided on the counter shaft 92.

Output rotation of the transmission mechanism outputted from the counter drive gear is transmitted to the differential gear mechanism after deceleration via the counter shaft 92. The power inputted into the differential gear mechanism is then transmitted to the left and right axles 96 so that a rotational speed difference between the axles corresponds to a driving state.

As illustrated in FIGS. 1 to 4, the transmission case 2 has a case main body 3 which constitutes a contour of the transmission case 2, and an end cover 5 which blocks an opening end of the case main body 3, which opens on the opposite side from the drive source (i.e., left side). The case main body 3 is a cylindrical member extending parallel to the shaft directions of the transmission mechanism (shaft directions of the input shaft 14), and is disposed so as to surround the transmission mechanism. A converter housing 6 is coupled to a mating surface 3b at another opening end (the drive source side, i.e., right side) of the case main body 3. The converter housing 6 accommodates the torque converter.

As illustrated in FIGS. 2 to 4, a valve body 100 of the hydraulic control device, a piston cylinder 108 of the brake which constitutes the transmission mechanism, and a heat exchanger 30 (described later) are integrally formed on the case main body 3 of the transmission case 2 by a three-dimensional lamination modeling method. Therefore, a reduction in the number of components and the assembly time is achieved, as well as a downsizing and a weight reduction of the entire automatic transmission 1.

Valve Body of Hydraulic Control Device

The valve body 100 has a substantially cylindrical overall shape which extends parallel to the shaft directions of the transmission mechanism, and is disposed so as to surround the transmission mechanism.

The piston cylinder 108 is integrally formed with the valve body 100 so as to project radially inwardly from an inner circumferential surface 100a of the valve body 100. The piston cylinder 108 is comprised of an annular vertical wall part 104 extending radially inwardly from the inner circumferential surface of the valve body 100, and an inner cylinder part 106 extending in the shaft direction from the inner circumferential end of the vertical wall part 104 to the opposite side from the drive source. The piston cylinder 108 is formed in a circumferential groove shape which opens to the opposite side from the drive source in the shaft directions. A hydraulic chamber (not illustrated) is formed in the piston cylinder 108 by accommodating a piston (not illustrated) of the brake of the transmission mechanism.

Moreover, a plurality of valve insertion holes 120 to which solenoid valves 150 and spool valves 160 are mounted, and an oil channel 110 which is connected to the valve insertion holes 120, are formed in the valve body 100.

The oil channel 110 connected to the valve insertion holes 120 is formed at the same time when forming, by modeling, the valve body 100 by the three-dimensional lamination modeling method. Therefore, a higher degree of freedom in design is available for the particular structure of the oil channel 110, such as the direction or orientation, the arrangement, the cross-sectional shape, and the number of the oil channel(s) 110, compared with a conventional case where the oil channel is formed by die molding. Thus, for example, if a great portion of the oil channel 110 is formed extending in the circumferential direction to conform to the shape of the valve body 100, the valve body 100 will be reduced in the radial dimension.

The valve insertion holes 120 are formed by, after pilot holes are formed at the same time when modeling the valve body 100 by the three-dimensional lamination modeling method, finishing the inner circumferential surfaces of the pilot holes. Note that the valve insertion holes 120 may be formed only by machining after the modeling, without forming the pilot holes in the valve body 100 at the same time when modeling by the three-dimensional lamination modeling method.

The valve insertion holes 120 are disposed along the inner circumferential surface 100a of the valve body 100 so that the insertion holes are spaced apart from each other in the circumferential directions. All the valve insertion holes 120 are formed extending in the shaft directions of the transmission mechanism, and open toward the drive source in the shaft direction. Thus, when finishing the inner circumferential surfaces of the valve insertion holes 120, the finishing can be performed from the same direction for all the valve insertion holes 120, and when attaching the valves 150 and 160 to the valve insertion holes 120, all the valves 150 and 160 can be inserted from the same direction.

The solenoid valves 150 and the spool valves 160, as well as the oil channel 110 of the valve body 100 etc., constitute a hydraulic controlling circuit (not illustrated). The hydraulic controlling circuit controls, by the operation of the solenoid valves 150 and the spool valves 160, supply and discharge of the oil to/from the hydraulic chambers of the friction coupling elements which constitute the transmission mechanism, parts to be lubricated which are located inside the transmission case 2, such as gear meshed parts and bearing parts of the transmission mechanism, each component of the torque converter, etc.

The solenoid valves 150 may be linear solenoid valves or on/off solenoid valves. For example, the linear solenoid valve is used as a valve which directly controls hydraulic pressure supplied to the hydraulic chambers of the friction coupling element, and the on/off solenoid valve is used as a valve which opens and closes hydraulic supply paths to control ports of the spool valves 160.

The spool valves 160 may function as, for example, various types of selector valves, such as, pressure-adjusting regulator valves which adjust a discharge pressure of a mechanical oil pump to a line pressure, manual valves which interlock with operation of the gear stick by an operator to switch the hydraulic supply path, fail-safe valves which switch the hydraulic supply path so that a given gear ratio is achieved when the solenoid valves 150 have failed, etc.

Note that other components which constitute the hydraulic controlling circuit, such as check valves and orifices, may be additionally and integrally provided to the valve body 100. If the check valves, orifices, etc. are constructed as separate parts from the valve body 100, mounting parts, such as holes to which the separate parts are mounted, may be formed in the valve body 100.

Heat Exchanger

As illustrated in FIG. 2, the automatic transmission 1 according to this embodiment further includes the heat exchanger 30 which exchanges heat between the oil supplied to each component inside the transmission case 2 and heat transfer medium (heat medium), such as water, supplied from the outside of the automatic transmission 1 (e.g., from an engine cooling system). The heat exchanger 30 is integrally formed with part of a peripheral wall 3a of the case main body 3 of the transmission case 2. The heat exchanger 30 is provided between an external surface 3d and an internal surface 3e of the peripheral wall 3a.

In detail, the heat exchanger 30 is continuously formed in the circumferential directions, for example, from a part of the peripheral wall 3a near the location directly below the input shaft 14 to a part above the axle 96 via a part disposed at the vehicle body front side and part above the counter shaft 92.

In addition, the heat exchanger 30 is continuously formed in the body width directions in the part of the peripheral wall 3a illustrated as an area T in FIGS. 3 and 4. Thus, the area T where the heat exchanger 30 is formed extends over most of the part of the peripheral wall 3a in the vehicle body width directions, extends from the top part to the part neat the bottom part of the peripheral wall 3a in vehicle body vertical directions, and extends from the front end part to the part near the rear end part of the peripheral wall 3a in the vehicle body in front-and-rear directions.

Note that the area in the peripheral wall 3a where the heat exchanger 30 is formed is not limited to the part described above but may suitably be changed. Alternatively, the heat exchanger 30 may be formed entirely in the peripheral wall 3a, or may be dividedly formed in a plurality of areas in the peripheral wall 3a.

Figure 5:
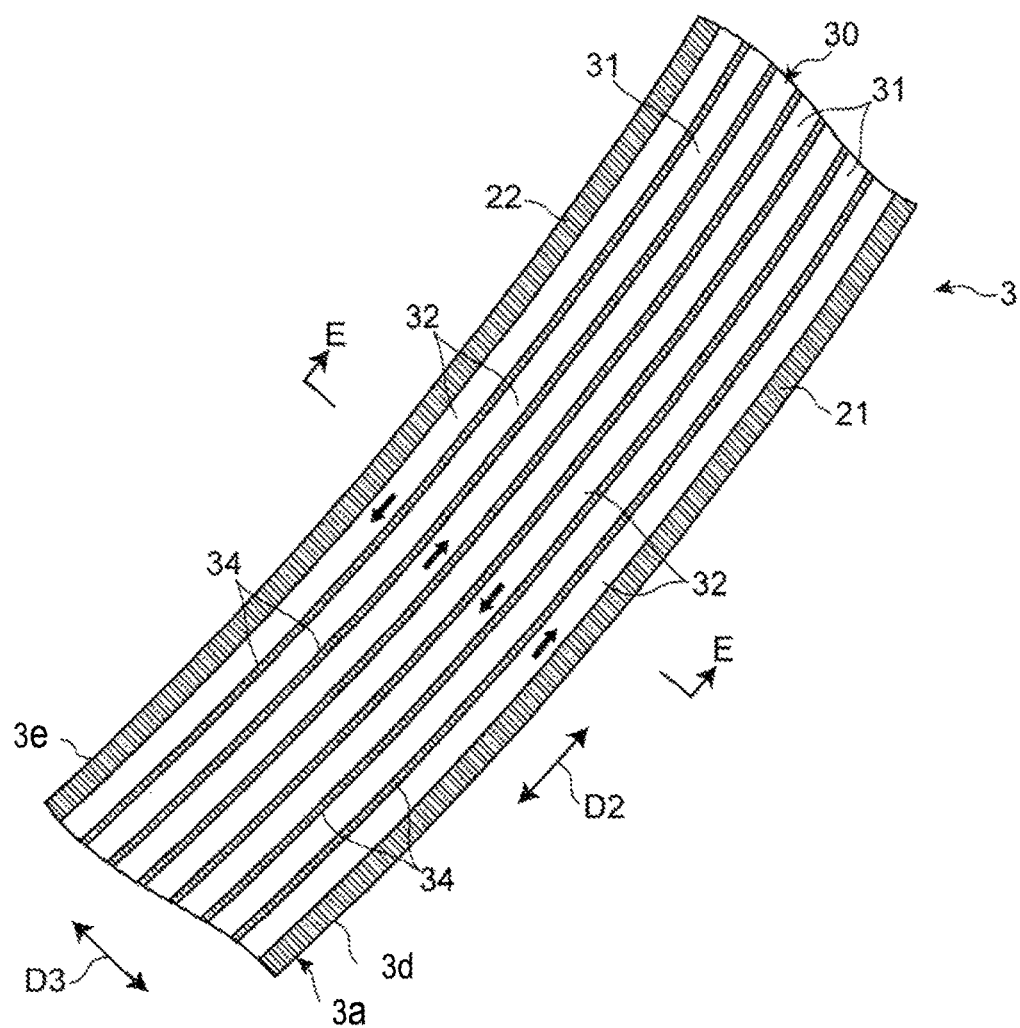
FIG. 5 is a cross-sectional view of a heat exchanger, which is an enlargement of a D-section of FIG. 2.

As illustrated in FIG. 5, in the part where the heat exchanger 30 is formed, the peripheral wall 3a of the case main body 3 includes an external wall part 21 which constitutes the external surface 3d of the peripheral wall 3a, and an internal wall part 22 which constitutes the internal surface 3e of the peripheral wall 3a. The external wall part 21 and the internal wall part 22 are disposed so as to be spaced apart from each other in thickness directions of the peripheral wall 3a (wall thickness directions D3). The external wall part 21 and the internal wall part 22 are disposed in parallel to each other in most locations in circumferential directions D2.

The heat exchanger 30 is formed between the external wall part 21 and the internal wall part 22 which constitute the peripheral wall 3a. The heat exchanger 30 includes an oil channel 31 where the oil supplied to each component inside the transmission case 2 flows, and a heat-medium channel 32 where the heat medium, such as water, flows.

The oil channel 31 and the heat-medium channel 32 are formed extending in directions which intersect perpendicularly to the wall thickness directions D3 (specifically, extending in the circumferential directions D2). Thus, the entire heat exchanger 30 can be compactly formed in the wall thickness directions D3. Moreover, the oil channel 31 and the heat-medium channel 32 are disposed in parallel to each other, and thus, the heat exchange can effectively be achieved between the oil and the heat medium. The oil channel 31 and the heat-medium channel 32 each have a channel portion which flows in one of the circumferential directions D2, and a channel portion which flows in the other direction, respectively, and these channel portions communicate with each other.

One end of the oil channel 31 is connected to an oil channel 112 (see FIG. 2) for introduction, and the other end of the oil channel 31 is connected to an oil channel 114 (see FIG. 2) for supply. The introduction oil channel 112 and the supply oil channel 114 are formed in the valve body 100, and are connected to another oil channel 110 formed in the valve body 100. Here, since the heat exchanger 30 is integrally formed with the valve body 100, no connecting member is necessary to connect the oil channel 31 to the introduction oil channel 112 and the supply oil channel 114 of the valve body 100. Therefore, a reduction in the number of components and the assembly time is achieved.

Thus, since the oil channel 31 is connected to the oil channel 110 of the valve body 100, the heat-exchanging oil is introduced into the oil channel 31 from the oil channel 110 of the valve body 100 via the introduction oil channel 112, and is cooled by the low-temperature heat medium which flows in the heat-medium channel 32 or is heated by the high-temperature heat medium when the oil flows in the oil channel 31. The oil is then discharged to the oil channel 110 of the valve body 100 via the supply oil channel 114 from the oil channel 31, and the discharged oil is supplied to each component inside the transmission case 2 by being controlled by the hydraulic control device to be used for lubrication, cooling, or hydraulic control.

On the other hand, one end of the heat-medium channel 32 is connected to a supply port 41 (see FIG. 2) to which the heat medium is supplied, and the other end of the heat-medium channel 32 is connected to a discharge port 43 (see FIG. 2) from which the heat medium is discharged.

As illustrated in FIG. 2, the supply port 41 and the discharge port 43 are formed at tip ends of cylindrical piping connections 40 and 42 which project from the part of the external surface 3d of the peripheral wall 3a of the case main body 3 where the heat exchanger 30 is formed. The piping connections 40 and 42 are connected, for example, to piping which communicates with the engine cooling system.

Although the piping connections 40 and 42 are formed, for example, at one end of the circumferential directions D2 (see FIG. 5) of the heat exchanger 30 and are disposed at locations near the bottom of the case main body 3 in this embodiment, they may be formed at any location of the peripheral wall 3a of the case main body 3. Therefore, the layout of piping connected to the piping connections 40 and 42 can also be designed freely.

Since the heat-medium channel 32 is connected to the engine cooling system as described above, the comparatively low-temperature or comparatively high-temperature heat medium supplied from the cooling system to the heat-medium channel 32 via the supply port 41 flows in the heat-medium channel 32 to exchange heat with the oil flowing in the oil channel 31 to cool or heat the oil. The oil flowing in the heat-medium channel 32 is then discharged from the discharge port 43 and is returned to the engine cooling system.

Note that the engine cooling system is preferably provided with the channel where the comparatively low-temperature heat medium flows, the channel where the comparatively high-temperature heat medium flows, and a selector which selectively connects these channels to the supply port 41. Therefore, the temperature of the heat medium supplied to the heat-medium channel 32 can be switched between cool and hot.

Figure 6:
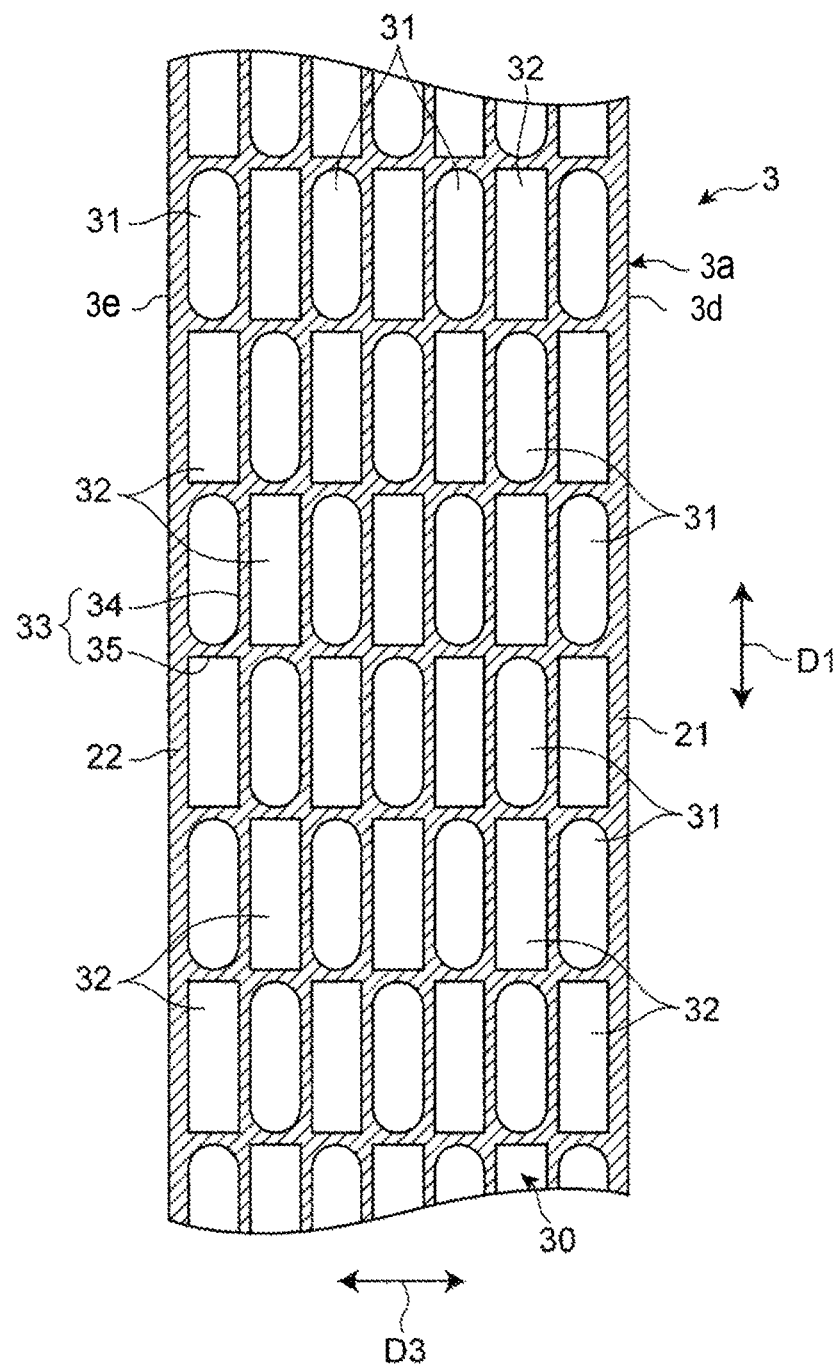
FIG. 6 is a cross-sectional view taken along a line E-E in FIG. 5, illustrating one example of a cross-sectional structure of the heat exchanger.

In FIG. 6, one example of a cross-sectional structure of the heat exchanger 30 is illustrated. In the example illustrated in FIG. 6, the oil channel 31 and the heat-medium channel 32 are alternately arranged both in the wall thickness directions D3 and the shaft directions D1 of the transmission mechanism.

The cross-sectional shape of the oil channel 31 is an oval shape which is elongated in the shaft directions D1. Thus, since the corner parts of the oil channel 31 are rounded in the cross section, it is difficult for high-viscosity oil to adhere to the corner parts and to obstruct the oil flow when the oil is at a low temperature.

On the other hand, the cross-sectional shape of the heat-medium channel 32 is a rectangular shape which is elongated in the shaft directions D1. The heat-medium channel 32 is formed with right-angled corner parts in the cross section, and thus, it has a larger cross-sectional area than the oil channel 31.

Each cross section of the oil channel 31 and each cross section of the heat-medium channel 32 is surrounded by peripheral walls 33 comprised of a pair of first wall parts 34 extending in the shaft directions D1 and a pair of second wall parts 35 extending in the wall thickness directions D3.

A plurality of first wall parts 34 are provided between the external wall part 21 and the internal wall part 22 so as to be separated from each other in the wall thickness directions D3, and pairs of first wall parts 34 which are adjacent to each other in the wall thickness directions D3 are integrally formed via each of the plurality of second wall parts 35. Each first wall part 34 divides the oil channel 31 and the heat-medium channel 32 which are located adjacent to each other in the wall thickness directions D3.

A plurality of second wall parts 35 are provided in the shaft directions D1 so as to be separated from each other, and pairs of second wall parts 35 which are adjacent to each other in the shaft directions D1 are integrally formed via each of the plurality of first wall parts 34. Each second wall part 35 is provided so as to extend in the wall thickness directions D3 from the external wall part 21 to the internal wall part 22, and divides the oil channel 31 and the heat-medium channel 32 which are located adjacent to each other in the shaft directions D1.

Thus, since the first wall parts 34 and the second wall parts 35 are provided, a plurality of peripheral walls 33 are provided between the external wall part 21 and the internal wall part 22 so that they are integrally formed in a lattice shape. The peripheral walls 33 which are formed in the lattice shape are integrally formed with the external wall part 21 and the internal wall part 22, and thus, the peripheral walls 33 are integrally formed with the peripheral wall 3a of the case main body 3.

Thus, the peripheral walls 33 which integrally connect the external wall part 21 to the internal wall part 22 function as a reinforcement part which reinforces the portion of the peripheral wall 3a which is hollowed in order to form the heat exchanger 30. Therefore, the rigidity of the hollowed portion of the peripheral wall 3a is increased. In addition, since the peripheral walls 33 of the oil channel 31 and the heat-medium channel 32 function as the reinforcement part as described above, an exclusive reinforcement part is omissible. Therefore, the arrangement space of the oil channel 31 and the heat-medium channel 32 is well-secured, and thus, an improvement in the heat-exchange performance of the heat exchanger 30 is achieved.

Figure 7:
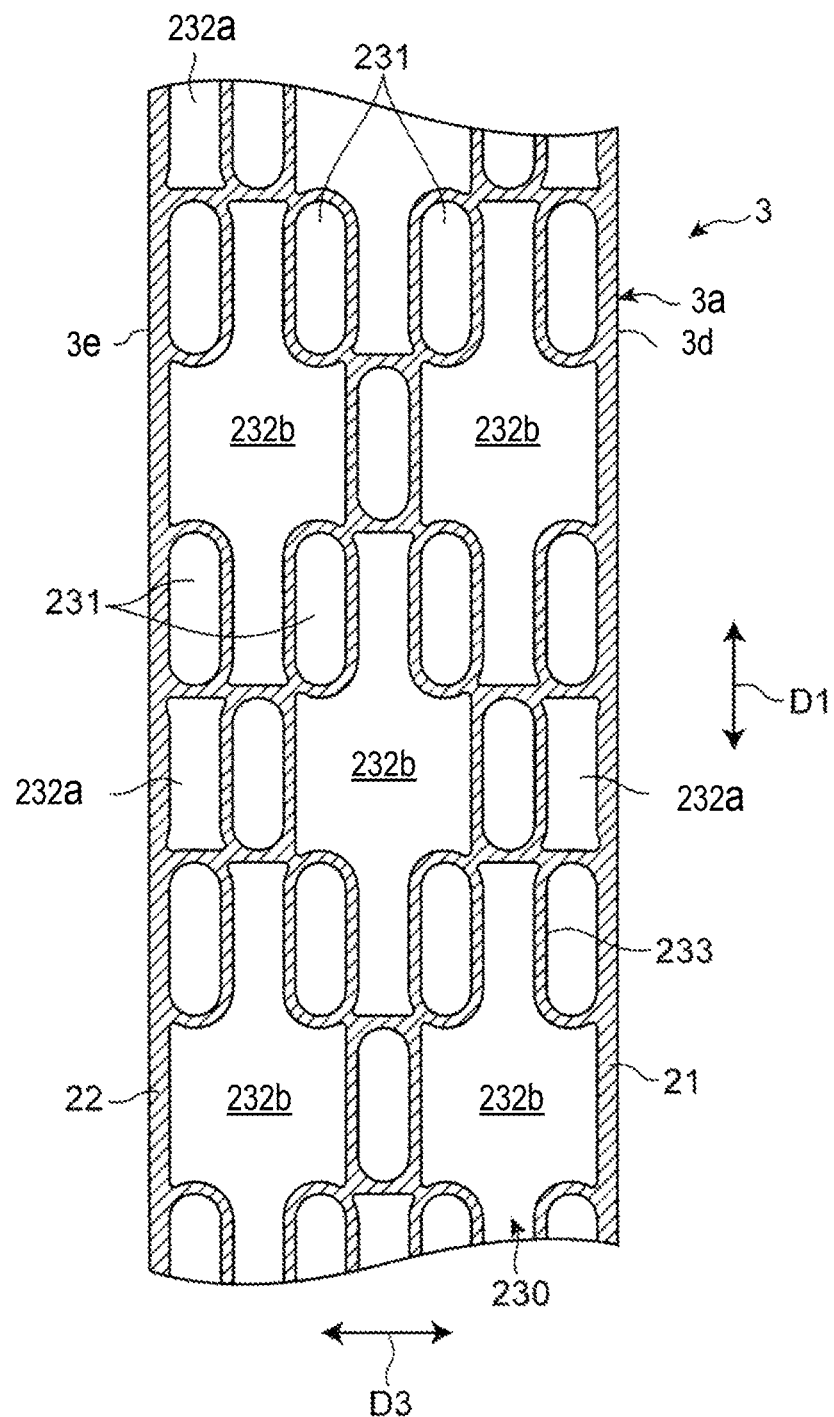
FIG. 7 is a cross-sectional view similar to FIG. 6, illustrating a first modification of the cross-sectional structure of the heat exchanger.
Figure 8:
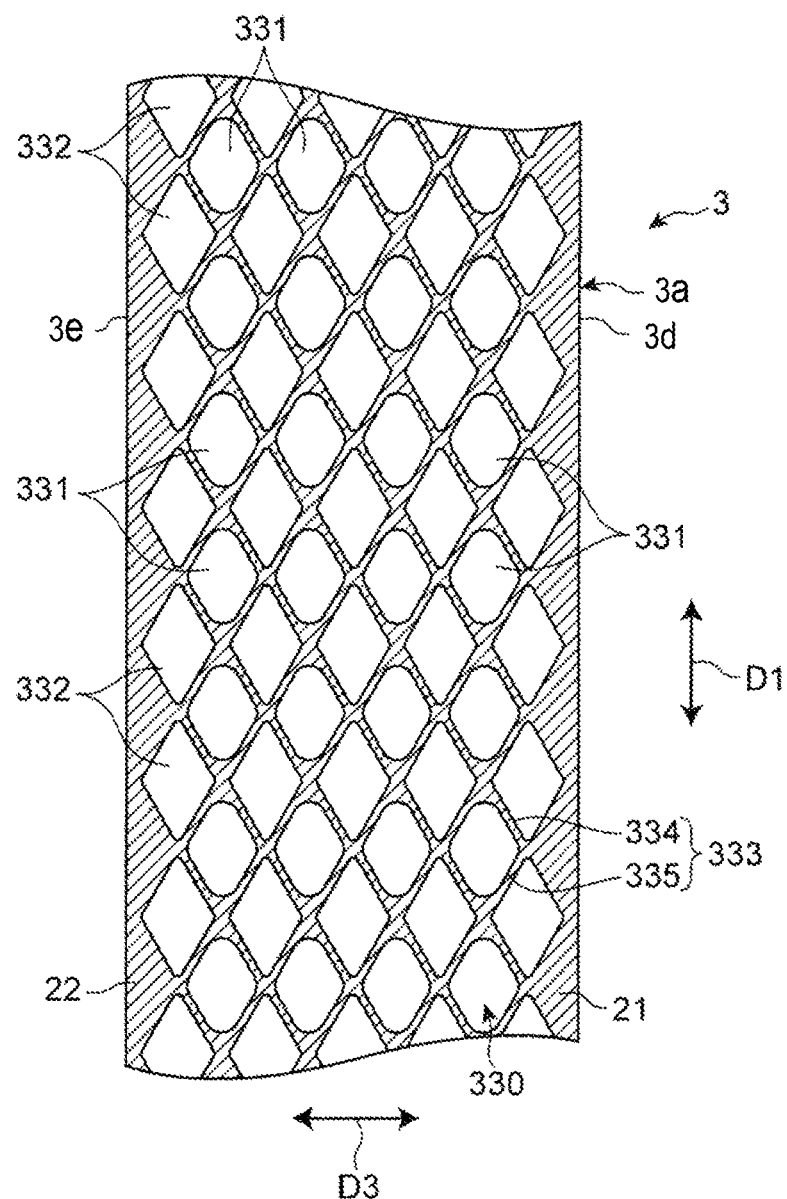
FIG. 8 is a cross-sectional view similar to FIG. 6, illustrating a second modification of the cross-sectional structure of the heat exchanger.

The heat exchanger 30 is not limited to having the cross-sectional structure illustrated in FIG. 6, and other cross-sectional structures, such as a first modification illustrated in FIG. 7 and a second modification illustrated in FIG. 8, may also be possible.

As illustrated in FIG. 7, a heat exchanger 230 according to the first modification has, in the cross section, a heat-medium channel 232a which is similar to the heat-medium channel 32 illustrated in FIG. 6, and a heat-medium channel 232b which is formed into a cross shape in this cross section by expanding the heat-medium channel 232a in both the shaft directions D1 and both the wall thickness directions D3. Thus, the heat-medium channel has two kinds of coexisting cross-sectional shapes. An oil channel 231 has a cross-sectional shape which is similar to the oil channel 31 illustrated in FIG. 6, and any cross section of the oil channel 231 is located adjacent to the heat-medium channels 232a and 232b on both sides while having a peripheral wall 233 therebetween, respectively, in the shaft directions D1 and the wall thickness directions D3. Therefore, also in the first modification, oil which flows in the oil channel 231 exchanges heat effectively with the heat medium which flows in the heat-medium channels 232a and 232b.

In addition, also in the first modification, the peripheral walls 233 of the oil channel 231 and the heat-medium channels 232a and 232b are formed integrally with the external wall part 21 and the internal wall part 22 so as to bridge therebetween. Therefore, the peripheral walls 233 also function as the reinforcement part which reinforces the peripheral wall 3a of the case main body 3.

As illustrated in FIG. 8, in a heat exchanger 330 according to the second modification, peripheral walls 333 of an oil channel 331 and a heat-medium channel 332 are provided with first wall parts 334 and second wall parts 335 which are inclined in two different directions so that the oil channel 331 and the heat-medium channel 332 are formed in a diamond or rhombus shape in cross section. In addition, the oil channel 331 and the heat-medium channel 332 are alternatively disposed in directions which are inclined from the shaft directions D1 and the wall thickness directions D3.

Also in the second modification, the oil channel 331 and the heat-medium channel 332 are disposed adjacent to each other while having the peripheral wall 333 therebetween. Therefore, an effective heat exchange is possible between oil which flows in the oil channel 331 and heat medium which flows in the heat-medium channel 332.

In addition, the peripheral walls 333 are integrally formed in a slanted lattice, and integrally connect the external wall part 21 to the internal wall part 22. Therefore, since the peripheral walls 333 function as the reinforcement part, the rigidity of the peripheral wall 3a of the case main body 3 is suitably secured.

Method of Manufacturing Case Main Body

The case main body 3 of the transmission case 2 is integrally formed with the heat exchanger 30, the valve body 100, and the piston cylinder 108 by the three-dimensional lamination modeling method using a 3D printer. Thus, all the portions other than the hollowed portions, such as the oil channel 31 and the heat-medium channel 32 of the heat exchanger 30, and the valve insertion holes 120, the oil channel 110, the introduction oil channel 112, and the supply oil channel 114 of the valve body 100, are formed integrally.

The particular printing scheme of the three-dimensional lamination modeling method is not limited in particular. However, if metal, such as aluminum, is used as the material of the case main body 3, a powder sintering lamination modeling method may be adopted. For example, this method is repeatedly performing a process per layer, in which metallic powder is spread to form a layer, and an electron beam or laser is then irradiated at given portions of the metallic powder layer to sinter and model the irradiated portions.

Alternatively, if a plastic, or a natural or a synthetic resin is used as the material of the case main body 3, the powder sintering lamination modeling method may be adopted. However, the printing scheme may be selected from more of a variety of printing schemes (e.g., ink jet) when using the resin material, compared with the metal material. Therefore, the printing scheme may be selected according to a user's needs. Note that if the case main body 3 is made of the resin material, the case main body 3 may be covered by a metal cylindrical member in order to increase the rigidity of the transmission case 2.

Figure 9:
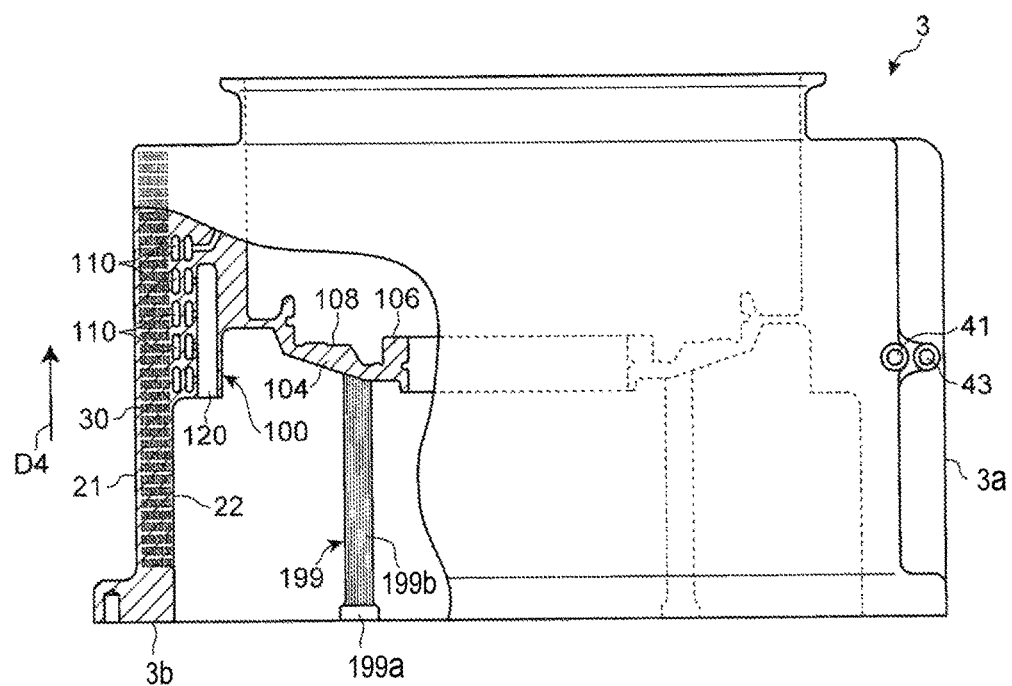
FIG. 9 is a partial cutaway side view illustrating a case main body, the heat exchanger, a valve body, a piston cylinder, and a support part of the transmission case which are integrally formed by a three-dimensional lamination modeling method.

As illustrated in FIG. 9, when forming the case main body 3 by the three-dimensional lamination modeling method, a laminating direction D4 is upward, and the case main body 3 is formed in a posture where the axial center of the valve body 100, the axial center of the valve insertion holes 120, and the axial center of the case main body 3 are oriented vertically.

In order to stably model the piston cylinder 108 of the case main body 3 in particular, it is preferable to integrally form with the case main body 3, during modeling, support parts 199 which support the piston cylinder 108 from below so that the support parts 199 extend upwardly from the bottom in the laminating direction D4. For example, each support part 199 is comprised of a flat cylinder part 199a formed at the bottom in the laminating direction D4, and a long cylindrical part 199b extending upwardly from the cylinder part 199a. The support parts 199 are provided at locations where, for example, the vertical wall part 104 needs to be supported.

Thus, since the support parts 199 are integrally modeled with the case main body 3, modeling of the piston cylinder 108, the valve body 100, and the heat exchanger 30, which are located above the support parts 199, is stably performed in a state where they are supported by the support parts 199 from below. Therefore, the piston cylinder 108, the valve body 100, and the heat exchanger 30 are formed with sufficient accuracy.

Moreover, since the valve insertion holes 120 are formed along axial centers parallel to the laminating direction D4 of the three-dimensional lamination modeling method, the inner circumferences of the valve insertion holes 120 are formed stably, during modeling of the valve body 100, without being collapsed. Therefore, the valve insertion holes 120 are formed with sufficient accuracy. Further, particularly for the valve insertion holes 120 for spool valves, smooth movements of the spools are achieved, and thus, a hydraulic control excellent in response is achieved.

When modeling of the case main body 3 by the three-dimensional lamination modeling method is finished, the support parts 199 will be removed. Since the cylindrical part 199b of the support part 199 is hollow inside so that it has low rigidity, the support parts 199 are easily removable.

Thus, the case main body 3 is completed by finishing, for example, the inner circumferential surfaces and the end faces of the valve insertion holes 120, and the portions connected to the support parts 199, and tapping bolt holes formed in both end surfaces of the case main body 3.

Note that it is not necessary to form the support parts 199, and if modeling is performed, particularly using the resin material, it is possible to omit the support parts 199 depending on the printing scheme to be adopted (e.g., powder sintering lamination modeling method).

As described above, since the heat exchanger 30 is integrally formed with the peripheral wall 3a of the case main body 3 by the three-dimensional lamination modeling method, the heat exchanger 30 is formed as part of the peripheral wall 3a. Thus, by utilizing the large area of the peripheral wall 3a, a sufficient space for exchanging heat between the oil and the heat medium is secured, and the heat exchanger 30 is formed compactly in the thickness directions of the peripheral wall 3a. Therefore, the automatic transmission 1 will not be increased in size even when the heat exchanger 30 is formed therewith. As a result, mountability of the automatic transmission 1 to a vehicle is increased, compared with the conventional automatic transmissions in which a heat exchanger is mounted outside a transmission case.

Furthermore, since the heat exchanger 30 is integrally formed with the peripheral wall 3a of the case main body 3, part of the peripheral wall 3a is also used as the heat exchanger 30. Therefore, the material needed to form the case main body and the heat exchanger is reduced, compared with the conventional automatic transmissions in which the case main body and the heat exchanger are separately formed. Further, a downsizing and a weight reduction of the automatic transmission 1 are achieved, and thus, the mountability of the automatic transmission 1 to a vehicle improves, and a fuel consumption of the vehicle is reduced.

Moreover, since the heat exchanger 30 is integrally formed with the peripheral wall 3a of the case main body 3, a degree of freedom in layout of peripheral components of the automatic transmission 1 is increased, compared with the conventional automatic transmissions in which a heat exchanger is disposed outside a transmission case. In addition, since brackets and seal members for mounting the heat exchanger to the outside of the transmission case are omitted, the number of components is reduced and assembly is simplified.

Furthermore, since the valve body 100 of the hydraulic control device is also integrally formed by the three-dimensional lamination modeling method with the case main body 3 and the heat exchanger 30, the number of components and assembly time of the automatic transmission 1 are further reduced, and a further downsizing and weight reduction of the automatic transmission 1 are achieved.

Although the present invention is described by the above embodiment, the present invention is not limited to the embodiment.

For example, although in the above embodiment, one example is described in which the valve body 100 and the piston cylinder 108 are also integrally formed with the case main body 3 and the heat exchanger 30, the valve body and the piston cylinder may be separately formed from the transmission case in the present invention.

Moreover, although in the above embodiment, a case is described where the present invention is applied to the automatic transmission, the present invention may also be applicable to a manual transmission.

As described above, according to the present invention, in a transmission provided with a heat exchanger having a heat-exchange function, since it is possible to achieve a downsizing of the transmission, an improvement in a degree of freedom in layout of peripheral components of the transmission, a reduction in the number of components, and a simplification of assembly, the transmission may be suitably used in industrial fields manufacturing this kind of transmission and vehicles to which the transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Automatic Transmission
2 Transmission Case
3 Case Main Body
3a Peripheral Wall of Case Main Body
3b Mating Surface with Converter Housing
3d External Surface of Peripheral Wall
3e Internal Surface of Peripheral Wall
5 End Cover
6 Converter Housing
14 Input Shaft
21 External Wall Part
22 Internal Wall Part
30 Heat exchanger
31 Oil Channel
32 Heat-medium Channel
33 Peripheral Wall of Channel
34 First Wall Part
35 Second Wall Part
40 Piping Connection
41 Supply Port
42 Piping Connection
43 Discharge Port
92 Counter Shaft
96 Axle
100 Valve Body
104 Vertical Wall Part
106 Inner Cylinder Part
108 Piston Cylinder
110 Oil Channel
112 Oil Channel for Introduction
114 Oil Channel for Supply
120 Valve Insertion Hole
150 Solenoid Valve
160 Spool Valve
199 Support Part
230 Heat exchanger
231 Oil Channel
232a Heat-medium Channel
232b Heat-medium Channel
233 Peripheral Wall of Channel
330 Heat exchanger
331 Oil Channel
332 Heat-medium Channel
333 Peripheral Wall of Channel
334 First Wall Part
335 Second Wall Part

What is claimed is:

1. A transmission, comprising:
a transmission case accommodating a transmission mechanism; and
a heat exchanger for exchanging heat between oil supplied to a given location inside the transmission case and a heat transfer medium supplied from the outside of the transmission case, the heat exchanger being provided between an external surface and an internal surface of the transmission case,
wherein the heat exchanger is provided with an oil channel where the oil flows and a heat-medium channel where the heat transfer medium flows, and peripheral walls of the oil channel and the heat-medium channel are integrally provided with a peripheral wall of the transmission case, and
wherein the oil channel and the heat-medium channel extend in directions perpendicular to a thickness of the peripheral wall of the transmission case and are alternatingly arranged along the thickness.

2. The transmission of claim 1, wherein the transmission case includes:
an external wall part constituting the external surface;
an internal wall part disposed inwardly from the external wall part and separated from the external wall part, the internal wall part constituting the internal surface; and
a reinforcement part integrally connecting the external wall part and the internal wall part,
wherein the heat exchanger is provided between the external wall part and the internal wall part.

3. A transmission, comprising:
a transmission case accommodating a transmission mechanism; and
a heat exchanger for exchanging heat between oil supplied to a given location inside the transmission case and a heat transfer medium supplied from the outside of the transmission case, the heat exchanger being integrally provided to at least a part of a peripheral wall of the transmission case,
wherein the heat exchanger is provided with an oil channel where the oil flows and a heat-medium channel where the heat transfer medium flows, and peripheral walls of the oil channel and the heat-medium channel are integrally provided with the peripheral wall of the transmission case, and
wherein the oil channel and the heat-medium channel extend in directions perpendicular to a thickness of the peripheral wall of the transmission case and are alternatingly arranged along the thickness.

4. The transmission of claim 3, wherein the transmission case is a tubular member extending parallel to axial directions of an input shaft of the transmission mechanism.

5. A method of manufacturing a transmission provided with a transmission case that accommodates a transmission mechanism, and a heat exchanger for exchanging heat between oil supplied to a given location inside the transmission case and a heat transfer medium supplied from the outside of the transmission case, comprising:
integrally forming the heat exchanger with a peripheral wall of the transmission case by a three-dimensional lamination modeling method, the heat exchanger being formed in at least a part of the peripheral wall of the transmission case.

6. The method of claim 5, wherein an external wall part constituting an external surface of the peripheral wall of the transmission case, an internal wall part disposed inwardly from the external wall part and separating from the external wall part, the internal wall part constituting an internal surface of the peripheral wall, and a reinforcement part integrally connecting the external wall part and the internal wall part, are formed in at least the part of the peripheral wall, the heat exchanger being formed between the external wall part and the internal wall part.

7. The method of claim 6, wherein an oil channel where the oil flows and a heat-medium channel where the heat transfer medium flows are formed in the heat exchanger, and the reinforcement part is comprised of peripheral walls of the oil channel and the heat-medium channel.

8. The method of claim 7, wherein the peripheral wall of the transmission case, the heat exchanger, and a valve body of a hydraulic control device for controlling the transmission mechanism are integrally formed by the three-dimensional lamination modeling method so that the oil channel fluidly communicates with an oil channel of the valve body by being coupled thereto.

9. The method of claim 5, wherein the peripheral wall of the transmission case is formed into a tube having an axial center parallel to a laminating direction of the three-dimensional lamination modeling method.

* * * * *